United States Patent Office 2,714,607
Patented Aug. 2, 1955

2,714,607

POLYETHOXY ESTERS OF p-BUTYLAMINO-BENZOIC ACID

Max Matter, Worb, near Bern, Switzerland, assignor, by mesne assignments, to Ciba Pharmaceutical Products Inc., Summit, N. J., a corporation of New Jersey No Drawing. Application February 13, 1951, Serial No. 210,796

Claims priority, application Switzerland February 15, 1950

5 Claims. (Cl. 260—471)

Esters of high molecular fatty acids and polyethylene glycols or polyethylene glycol monoalkyl ethers are known; these compounds possess surface-active properties and are used in technics as wetting agents, detergents and emulsifiers.

Esters from isocyclic carboxylic acids and polyethylene glycols or polyethylene glycol monoalkyl ethers have not become known in the past as no particular properties of such compounds were to be expected. From experiments made by the applicant it became clear, however, that certain groups of this class of compounds have excellent pharmacological properties and that they can for instance be used as infiltration anesthetics, spasmolytics, analeptics and bacteriostatics. Such surprising effects are remarkable because, for instance for the preparation of spasmolytics, the simultaneous use of aminoalcohols or other nitrogen containing compounds was thought necessary.

The main object of my present invention is concerned with new compounds corresponding to the following general formula R.O(CH2.CH2.O)$_n$CH2.CH2.O.X wherein R stands for hydrogen or a hydrocarbon radical having at most 6 carbon atoms,
n means 4 to 50 inclusive and
X means the radical of a carboxylic acid containing at least one isocyclic ring.

According to a further object of the present invention these new compounds are obtained by esterifying isocyclic, organic carboxylic acids or their functional derivatives with polyethylene glycols or with polyethylene glycol monoalkyl ethers. The polyethylene glycol esters are obtained also by reacting ethylene oxide with the carboxylic acids or with esters of the following general formula HO(CH2.CH2.O)$_a$.X wherein
a Means 1 to 4 inclusive and
X means the radical of a carboxylic acid containing at least one isocyclic ring, it being necessary in this case that severe conditions are applied; for this reason that process will fail with sensitive carboxylic acids.

The esterification of the carboxylic acids with the polyethylene glycols and with the polyethylene glycol monoalkyl ethers respectively can be carried out directly or it can be esterified over the acid chloride or the acid anhydride, for instance according to Schotten-Baumann, or in the presence of pyridine. In some other instances it is more convenient to apply the alcholysis method.

As isocyclic carboxylic acids may be used the most various kinds of aryl, aralkyl, cycloalkyl and cycloalkyl alkyl carboxylic acids such as benzoic acid, their homologues and substitution products, nitrobenzoic acids, amino-benzoic acids, p-aminosalicyclic acid, cinnamic acids, diphenyl acetic acids, diphenyl-hydroxy-acetic acids, tropic acid, chaulmoogric acid or the like.

The substituted alcohols used as starting materials are known or can easily be obtained according to an analogical method. They have the following general formula R.O.(CH2.CH2.O)$_n$CH2.CH2.OH wherein
n Stands for 4 to 50 inclusive and
R stands for hydrogen or a hydrocarbon radical having at most 6 carbon atoms.

If for instance R stands for isobutyl the polyethylene glycol derivative is obtained by reacting ethylene glycol monoisobutyl ether with n moles of ethylene oxide in a pressure vessel at a temperature of 160° to 170° C. in the presence of catalytic amounts of potassium hydroxide.

The new esters are useful as medicines, disinfectants and as intermediates respectively.

The following examples serve to illustrate and explain the present invention without, however, being restrictive. The relationship of parts by weight to parts by volume is that of kilograms to litres.

*Example 1*

270 parts by weight of a mixture of hydnocarpic acid and chaulmoogric acid (obtained by saponification of chaulmoogra oil) of the average molecular weight 270 and a mixture of 360 parts by weight of polyethylene glycol monomethyl ether of the average molecular weight 350 and 15 parts by weight of 65% sulphuric acid are heated together at a temperature of 120° C., while introducing a stream of nitrogen, until a sample is soluble in cold water; this lasts 1 to 3 hours. For purification the mixture is vigorously stirred with 600 parts by weight of alumina and 3000 parts by volume of benzene for 1 hour. After filtration and washing of the alumina with benzene the filtrate is evaporated. The remaining residue consists of a mixture of the esters of the hydnocarpic and chaulmoogric acids of polyethylene glycol monomethyl ether in form of a light yellow oil which is easily soluble in water and in nearly all organic solvents with the exception of ether and of aliphatic hydrocarbons. The new ester shows excellent tuberculostatic properties and is only slightly toxic for warm blooded animals.

The above mentioned mixture of hydnocarpic and chaulmoogric acids was produced from technical hydnocarpic oil in the following way. By saponification the raw acid mixture was first obtained which was purified after conversion into the methyl ester, by distillation at 0.1 mm. pressure at a temperature of 125° to 135° C. By saponification with sodium hydroxide in 80% isopropanol the acid mixture was obtained as a soft white mass.

Esters with similars properties are obtained if, instead of polyethylene glycol monomethyl ether having the average molecular weight 350, equimolecular quantities of polyethylene glycol monopropyl, isopropyl, butyl or isobutyl ether of the average molecular weight 500 to 2200 are used. If the esterification is applied to a polyethylene glycol monomethyl ether of the average molecular weight 250 there is an ester obtained which is not soluble anymore at a temperature of 37° C. but which is easy to emulsify.

*Example 2*

35 parts by weight of β-benzoylacrylic acid and 70 parts by weight of polyethylene glycol of the average molecular weight 300 and 300 parts by volume of benzene are mixed, treated with 2.5 parts of 60% sulphuric acid and boiled under reflux for 20 hours by using a separator for the water which is evaporated with the benzene vapours. Then it is rinsed with benzene in a separating funnel, washed once with a half-saturated sodium chloride solution and three times with saturated sodium hydrogen carbonate ($NaHCO_3$) solution. By evaporation of the benzene solution the raw polyethylene glycol ester of the benzoylacrylic acid is obtained as light brown oil. It is soluble in five times the amount of water and has disinfecting properties.

The thus obtained raw material can be purified as follows: After dissolution in six times the amount of water it is shaken with twice the quantity of active charcoal for half an hour and then filtered over "Celit 535" in a chromatographic column and washed with water, whereby almost the whole amount of ester will be adsorbed on the active carbon. By eluation with an acetone-water-mixture in the ratio of 1:2 a pure ester is obtained as light oil which is, in contradistinction to the raw material, clearly soluble in ten to hundred times the amount of water.

According to the above described method it is possible to esterify also diphenyl-4-carboxylic acid, 4'-chlorodiphenyl ether-4-carboxylic acid and diphenylmethane-4-carboxylic acid with polyethylene glycol monoalkyl ethers.

Example 3

35 parts by weight of β-benzoylacrylic acid, 2.5 parts by weight of p-toluene sulphonic acid and 80 parts by weight of polyethylene glycol monomethyl ether of the average molecular weight 350 are boiled under reflux in 300 parts by volume of benzene for 14 hours by using a continuous water-separator.

The benzene solution is thereupon extracted several times with a saturated sodium hydrogen carbonate solution, all aqueous extracts being washed once with benzene. By evaporation of the benzene solutions there is obtained the benzoylacrylic ester of the polyethylene glycol monomethyl ether in form of a light yellow, water-soluble oil.

The new ester shows in vitro a strong tuberculostatic activity and has an insignificant toxicity for warm blooded animals.

Instead of polyethylene glycol mono-methyl ether one can analogically esterify also polyethylene glycol cyclopentyl ether, polyethylene glycolcyclohexyl ether and polyethylene glycol phenyl ether with β-benzoylacrylic acid, valuable new compounds being thus obtained.

Example 4

8.25 parts by weight of ethyl p-aminobenzoate, 35 parts by weight of technical polyethylene glycol monomethyl ether of the average molecular weight 350 (dried in a high vacuo at 110° C.) and 4 parts by volume of a 2-normal sodium methylate solution in methanol are heated for 16 hours in vacuo at a pressure of 12 mm. of mercury at a temperature of 100° C. After this time a sample of the light brown oil taken from the reaction vessel is almost quantitatively water-soluble. The whole is poured in 250 parts by volume of water to which are added 5 parts by volume of a 2-n hydrochloric acid. After the addition of one part by volume of a saturated sodium bisulfite solution the mixture is adjusted to a pH 7.5 and shaken with 6 parts by weight of animal charcoal for one hour. The charcoal having been filtered off the filtrate is shaken several times with benzene. All the benzene extracts are washed three times with a saturated sodium hydrogen carbonate solution and evaporated. The excess of polyethylene glycol monomethyl ether is present in the aqueous layers and the p-aminobenzoic acid ester of the polyethylene glycol monomethyl ether is obtained, on evaporation of the benzene solutions, in form of a light yellow, clear oil. The new ester is soluble in water and can be used as local anaesthetic.

The same ester can also be obtained by catalytic hydrogenation of the p-nitrobenzoyl ester of polyethylene glycol monomethyl ether.

Using the same alcoholysis operation the p-butyl-aminobenzoyl ester of polyethylene glycol monomethyl ether can also be obtained.

Example 5

4.65 parts by weight of cinnamic acid chloride and 8.1 parts by weight of polyethylene glycol monomethyl ether of the average molecular weight 350 (dried at 110° C. in a high vacuo) are heated in 25 parts by volume of absolute pyridine for one hour to 100° C. After cooling it is poured on a mixture of 32 parts by volume of concentrated hydrochloric acid and 160 parts by weight of finely divided ice. Thereupon it is rinsed with 200 parts by volume of chloroform in a separating funnel and the chloroform solution washed each time twice with 2-n hydrochloric acid, a saturated sodium hydrogencarbonate solution and a half-saturated sodium chloride solution. On the evaporation of the chloroform solution the raw cinnamic acid ester of polyethylene glycol monomethyl ether remains in form of a light brown oil. It can be purified by treating it with a small amount of animal charcoal in an aqueous solution.

The new ester can be used as infiltration anaesthetic. The benzoic acid ester and the p-methylbenzoic acid ester are obtained in an analogous way, both having local anaesthetical properties.

Example 6

23.1 parts by weight of diphenylacetyl chloride and 50 parts by weight of polyethylene glycol monoethyl ether of the average molecular weight 500 are heated with 150 parts by weight of pyridine for one hour to 100° C. After cooling it is poured on a mixture of 300 parts by weight of finely divided ice and 170 parts by weight of concentrated hydrochloric acid. The mixture is then rinsed with 900 parts by volume of benzene in a separating funnel. After the discharge of the aqueous layer the benzene solution is extracted each time twice with 2-n hydrochloric acid, 2 n sodium carbonate solution and with a half-saturated sodium chloride solution; all the aqueous solutions are washed in a second separating funnel with 400 parts by volume of benzene. On the evaporation of the benzene solutions there remains a colourless oil which solidifies into a wax-like mass if allowed to stand for a long time, this mass being the diphenylacetic acid ester of polyethylene glycol monoethyl ether which is clearly soluble in water and which has spasmolytical properties. The new substance differs from the usual spasmolytics insofar as basic groups are missing in the molecule.

Phenyl cyclohexyl acetyl chloride can be esterified in an analogous way with polyethylene glycol monohexyl ether.

Example 7

21 parts by weight of phenyl cyclopentane-1-carboxylic acid chloride having a boiling point of 135° C. (10 mm. Hg), 35 parts by weight of dry technical polyethylene glycol monomethyl ether of the average molecular weight 350 and 150 parts by weight of absolute pyridine are mixed and heated to 110° to 120° C. After 5 minutes it is cooled to room temperature and allowed to stand for 10 hours. A copious white crystalline precipitate is being formed. By a short heating the whole is brought again into solution. The whole reaction mass is then poured on a mixture of 300 parts by weight of finely divided ice and 170 parts by volume of concentrated hydrochloric acid. The whole is rinsed with 600 parts by volume of benzene in a separating funnel, the aqueous layer isolated, the benzene solution extracted each time twice with 2-n hydrochloric acid and a saturated sodium hydrogen carbonate solution. The aqueous layers are washed once with fresh benzene. The combined benzene solutions which have been dried with sodium sulfate are evaporated. The phenyl cyclopentane-1-carboxylic acid ester of the polyethylene glycol monomethyl ether is left as a colourless oil which is easily soluble in chloroform, toluene, alcohol and acetone. The new ester is soluble in water at temperatures below about 30° C.; on heating it is separated from the aqueous solution. As the polyethylene glycol monomethyl ether used for the esterification consists of a mixture of substances with different degrees of polymerisation the new ester may also have a certain range in the molecular weight. The higher molecular portions can be separated from the low molecular portions by physical methods. For this purpose one may proceed as follows: 3.82 grams of the ester produced according to this example are dissolved in 100 cc. of water and extracted three times with 100 cc. of ether. The ethereal solutions are washed three times with 30 cc. of water. The ethereal solutions dried over sodium sulfate and evaporated, whereupon 3.10 grams of ester remain which can partly be precipitated from an aqueous solution by heating it to over 30° C. From the aqueous solutions 0.70 gram of ester can be isolated by extraction with chloroform, the ester is then precipitated in an aqueous solution only on heating it up to a temperature of over 60° C.; this fraction contains the higher molecular portions.

The new ester is a valuable spasmolytic.

What I claim is:

1. A new ester which corresponds to the formula

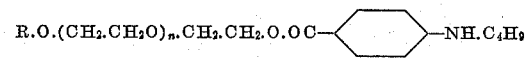

wherein $n$ stands for an integer from 4 to 50 inclusive, and R stands for a member selected from the group consisting of hydrogen and alkyl radicals containing not more than 6 carbon atoms.

2. A new ester which corresponds to the formula

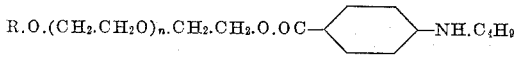

wherein $n$ stands for an integer from 4 to 50 inclusive, and R stands for an alkyl radical containing not more than 6 carbon atoms.

3. A new ester which corresponds to the formula

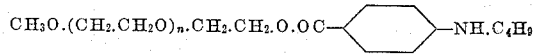

wherein $n$ stands for an integer from 4 to 50 inclusive.

4. The new ester of the formula

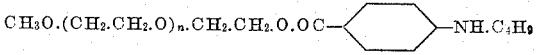

wherein $n$ means an integer from 6 to 50 inclusive.

5. The new ester of the formula

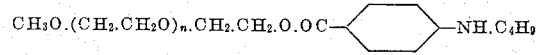

having an average molecular weight of about 525.

References Cited in the file of this patent

UNITED STATES PATENTS

| Number | Name | Date |
|---|---|---|
| 1,710,424 | Loehr | Apr. 23, 1929 |
| 1,970,578 | Scholler et al. | Aug. 21, 1934 |
| 2,115,700 | Andersen | May 3, 1938 |
| 2,269,529 | Goldsmith | Jan. 13, 1942 |
| 2,298,186 | Woodhouse | Oct. 6, 1942 |
| 2,396,513 | Jones | Mar. 12, 1946 |
| 2,454,808 | Kirkpatrick | Nov. 30, 1948 |
| 2,480,185 | Fife et al. | Aug. 30, 1949 |